United States Patent [19]

Maier et al.

[11] Patent Number: 5,007,248
[45] Date of Patent: Apr. 16, 1991

[54] BEVERAGE COOLING SYSTEM

[75] Inventors: Eliahu Maier, Petach Tikva; Yair Kovesh; Abraham Zorea, both of Kfar Szold, all of Israel

[73] Assignee: Lordan & Co., Mobile Post Galil Elyon, Israel

[21] Appl. No.: 429,145

[22] Filed: Oct. 30, 1989

[51] Int. Cl.⁵ ............................................... B60H 1/32
[52] U.S. Cl. ........................................ 62/244; 62/293; 62/457.9
[58] Field of Search ...................... 62/244, 293, 457.9

[56] References Cited

U.S. PATENT DOCUMENTS

| | | | |
|---|---|---|---|
| 2,401,613 | 9/1944 | Charland | 62/438 |
| 3,553,976 | 7/1968 | Cumine et al. | 62/294 |
| 3,858,405 | 10/1973 | Manzke | 62/196 |
| 3,912,475 | 8/1974 | Patrick | 62/7 |
| 4,103,510 | 12/1976 | Hall | 62/299 |
| 4,483,151 | 6/1982 | Fujioka et al. | 62/157 |
| 4,653,289 | 7/1985 | Hodgetts | 62/239 |
| 4,711,099 | 8/1986 | Polan | 62/457 |

FOREIGN PATENT DOCUMENTS

| | | |
|---|---|---|
| 2655022 | 12/1976 | Fed. Rep. of Germany . |
| 3740350 | 11/1987 | Fed. Rep. of Germany . |
| 2168467 | 12/1985 | United Kingdom . |

Primary Examiner—William E. Tapolcai
Attorney, Agent, or Firm—Abelman Frayne Rezac & Schwab

[57] ABSTRACT

A vehicle having an integrated air conditioning system and beverage cooling system comprising apparatus for compressing a refrigerant fluid, first apparatus for receiving and evaporating the compressed refrigerant fluid, apparatus associated with the air conditioning system for circulating air across the first apparatus for receiving and evaporating, and second apparatus in heat conductive engagement with a beverage container for receiving and evaporating the compressed refrigerant fluid.

4 Claims, 5 Drawing Sheets

BEVERAGE COOLING SYSTEM

FIELD OF THE INVENTION

The present invention relates in general to refrigeration devices and in particular to vehicle mounted devices for cooling beverages.

BACKGROUND OF THE INVENTION

Airconditioning systems for vehicles are well known and are used, particularly in hot climates, for cooling the interior of a vehicle. It is also known to use an existing vehicle air conditioning system to cool articles of food and drink being carried in a vehicle.

There is disclosed in U.S. Pat. No. 4,103,510 a portable cooling chest operatively attachable to an automobile air conditioning system. The system comprises a portable cooling chest having a durable outer shell and an inner liner, each with bottom and side wall members and includes a unitary middle liner arranged in proximity to the bottom and side wall members of the outer shell to define an insulating compartment and in proximity to the bottom and side wall members of the inner liner to define a sealed cavity circumscribing the inner liner and containing eutectic fluid and immersed heat exchange coils. The heat exchange coils, coupled through a quick connect/disconnect means to the refrigerant of an automobile refrigeration system, circulate chilled refrigerant to chill and freeze the eutectic fluid within the sealed cavity and cool the interior space of the cooling chest.

A disadvantage of the cooling chest disclosed in the above-mentioned U.S. Pat. No. is that it is bulky and invariably takes up space, for example, in the baggage compartment of a vehicle. In addition, access to the cooling chest is not possible from the interior of the vehicle. Furthermore, as articles placed in the cooling chest are cooled by virtue of the entire interior volume thereof being cooled, this way of cooling is relatively slow and inherently wasteful of energy.

There is disclosed in U.S. Pat. No. 3,858,405 a removably positioned refrigerated chest for motor vehicles. U.S. Pat. No. 4,483,151 discloses a car airconditioner with a freezer/refrigerator chamber. U.S. Pat. No. 4,483,151 discloses a refrigeration system having two evaporators, one of which provides general air conditioning and the other being provided for cooling a cooling chamber. As with the disclosure of U.S. Pat. No. 4,103,510, cooling apparatus employing a cooling chamber or the like is inherently slow and wasteful of energy.

U.S. Pat. No. 3,912,475 discloses a combined air conditioner, beverage cooler and engine efficiency booster. The beverage cooler comprises a pair of beverage cooling coils associated with a gasoline engine with a fuel intake providing a source of reduced pressure.

A particular disadvantage to the airconditioner and beverage cooler of the above-referred to patent is that it is not useful with vehicles not having the described fuel intake which provides a source of reduced pressure, nor may it be appended, if so desired, to an existing, conventional vehicle airconditioner.

Disclosed in U.S. Pat. No. 3,553,976 is a container refrigerator which is adapted for attachment to the outside of a container. A refrigerating member is a tubular member, the configuration of which is either that of a C-shaped ring member that can be expanded and snapped onto a cylinder or that of a helically coiled tube that can be expanded and slid onto the container and released to be held in place. The refrigerating member holds a refrigerating medium which can be vented for reduction of temperature and the medium can be expanded between portions of the refrigerating member.

There is also disclosed, in U.S. Pat. No. 4,711,099, a portable quick chilling device for cooling a beverage in a twelve ounce can from about 24 degrees celsius to about 7 degrees celsius in approximately four minutes. The evaporator of the device comprises a coil of tubing shaped to receive a generally cylindrical object to be chilled. There is also disclosed apparatus for opening the coil so as to enable insertion of the beverage can thereinto and for closing the coil such that it tightly grips the can.

In U.S. Pat. No. 4,653,289 there is disclosed a vehicle airconditioner ventilator-mounted receptacle for storage and cooling of food, drink or the like. The cooling of the goods contained within the receptacle is provided by circulation therewithin of the cool air flow from the ventilator. A disadvantage of this receptacle is that, as described in the examples, the temperature of goods cooled in the receptacle may be reduced in a relatively long time to a final temperature that is higher than the temperature of the cooled air circulated therearound.

Disclosed in U.S. Pat. No. 2,401,613 is a storage and cooling receptacle for use with a domestic refrigerator.

SUMMARY OF THE INVENTION

It is an aim of the present invention to provide a vehicle mounted, energy efficient, relatively inexpensive system for rapid cooling of individual standard-sized beverage containers.

It is also an aim of the present invention to provide a beverage cooling system for vehicles, linked to an air conditioning system thereof.

There is provided, therefore, in accordance with an embodiment of the invention, a vehicle having an integrated air conditioning system and beverage cooling system comprising apparatus for compressing a refrigerant fluid, first apparatus for receiving and evaporating the compressed refrigerant fluid, apparatus associated with the air conditioning system for circulating air across the first apparatus for receiving and evaporating, and second apparatus in heat conductive engagement with a beverage container for receiving and evaporating the compressed refrigerant fluid.

Additionally in accordance with an embodiment of the invention, the second apparatus for receiving and evaporating comprises an expansible sleeve arranged about a beverage container support volume.

Further in accordance with an embodiment of the invention, the sleeve comprises inner and outer concentric plates having respective C-shaped cross-sectional configurations, the plates being connected so as to define a sealable gap therebetween.

Additionally in accordance with an embodiment of the invention, there is also provided apparatus for selectively permitting flow of the refrigerant fluid into the sleeve, the sleeve contracting when flow of the refrigerant fluid thereinto is permitted and expanding when flow of the refrigerant fluid thereinto ceases.

In accordance with an alternative embodiment of the invention, the second evaporator comprises a coil arranged about a beverage container support volume, there also being provided apparatus for causing expansion and contraction of the coil.

Additionally in accordance with an embodiment of the invention, the coil comprises a fluid conduit having first and second ends and defines an inward-facing container engagement surface.

Further in accordance with an embodiment of the invention, the heat-conductive material is roll-bond plate.

According to one embodiment of the invention, the second apparatus for receiving and evaporating is arranged in series with and upstream of the first apparatus for receiving and evaporating, the second apparatus also comprising adjustable apparatus for constricting the flow of the fluid therethrough, there also being provided thermostatically-controlled apparatus associated with the apparatus for constricting operative to sense the temperature of the refrigerant fluid adjacent an outlet of the first apparatus for receiving and evaporating and to cause the apparatus for constricting to further constrict the fluid flow upon sensing a decrease in the temperature of the refrigerant fluid adjacent to the outlet.

According to an alternative embodiment of the invention, the second apparatus for receiving and evaporating is arranged in series with and upstream of the first apparatus for receiving and evaporating, there also being provided apparatus located downstream of the apparatus for compressing but upstream of the second apparatus for receiving and evaporating for receiving and expanding the refrigerant fluid comprising adjustable apparatus for constricting the flow of the fluid therethrough, there also being provided thermostatically-controlled apparatus associated with the apparatus for constricting operative to sense the temperature of the refrigerant fluid adjacent an outlet of the first apparatus for receiving and evaporating and to cause the apparatus for constricting to further constrict the fluid flow upon sensing a decrease in the temperature of the refrigerant fluid adjacent the outlet.

In accordance with a further alternative embodiment of the invention, there are also provided first and second apparatus located downstream of the apparatus for compressing and upstream of respective the first and the second apparatus for receiving and evaporating for receiving and causing expansion of the refrigerant fluid.

Additionally in accordance with the further embodiment of the invention, the first apparatus for receiving and causing expansion comprises apparatus for providing a first constriction to the fluid flow and the second apparatus for receiving and causing expansion comprises apparatus for providing a second constriction to the fluid flow greater than the first constriction.

In accordance with an additional embodiment of the invention, the first apparatus for receiving and causing expansion and the first apparatus for receiving and evaporating are arranged in series with and downstream of the second apparatus for receiving and causing expansion and the second apparatus for receiving and evaporating, there also being provided a valve associated with a fluid flow path extending between an inlet located upstream of the second apparatus for receiving and causing expansion and an outlet located between the second apparatus for receiving and evaporating and the first apparatus for receiving and causing expansion, the fluid being permitted to flow through the valve when the valve is open, substantially to the exclusion of fluid flow through the second apparatus for receiving and causing expansion and the second apparatus for receiving and evaporating, fluid flow being diverted through the second apparatus for receiving and causing expansion and the second apparatus for receiving and evaporating when the valve is closed.

In accordance with yet a further alternative embodiment of the invention, the second apparatus for receiving and causing expansion and the second apparatus for receiving and evaporating are associated with a flow path extending between an inlet upstream of the first apparatus for receiving and causing expansion and an outlet located between the first apparatus for receiving and causing expansion and the first apparatus for receiving and evaporating, there also being provided a valve located between the first apparatus for receiving and causing expansion and the flow path outlet.

BRIEF DESCRIPTION OF THE DRAWINGS

The present invention will be understood and appreciated more fully from the following detailed description taken in conjunction with the drawings, in which.

DETAILED DESCRIPTION OF THE INVENTION

Figure 1:
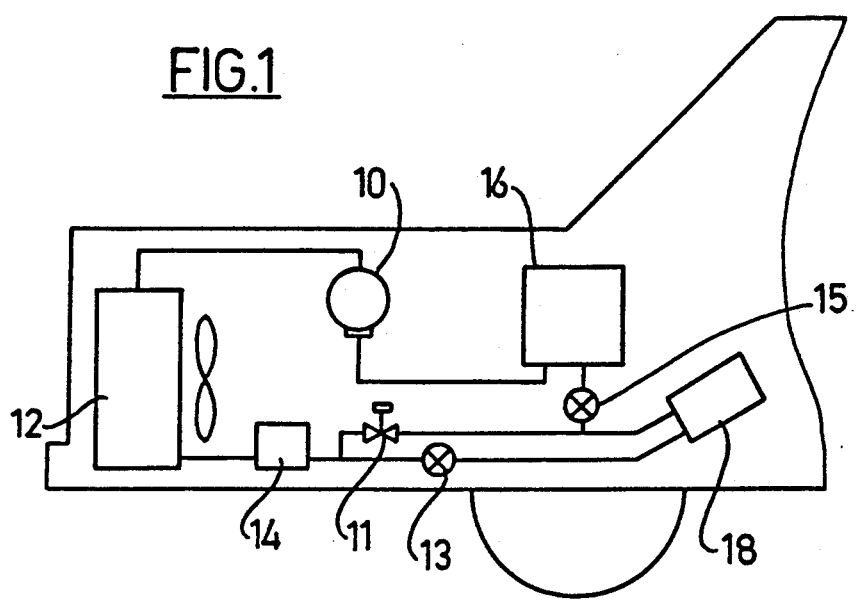
FIG. 1 is a block diagram illustration of a vehicle mounted cooling system, constructed and operative in accordance with the present invention.

Referring to FIG. 1 there is shown a block diagram of a vehicle mounted beverage cooling system, constructed and operative in accordance with an embodiment of the present invention.

The system comprises a conventional vehicle refrigeration or air conditioning system, which includes a compressor 10 for compressing a refrigerant fluid, a condenser 12 for condensing the fluid, a device 14 for filtering the fluid, an expansion valve 15 and an evaporation device 16, valve 15 and device 16 both serving to cool the fluid. Air to be cooled and passed into the interior of the vehicle is circulated over the evaporator by a fan 56 (FIG. 4) and is thereby cooled. A solenoid valve 11, when open, is operative to allow passage of the refrigerant fluid between filter 14 and expansion valve 15.

There is also provided a cooling element, referenced 18 which forms part of the beverage cooling system of the invention and which is configured to receive a standard-sized beverage container such as a 330 ml can and to cause rapid cooling of the beverage contained therein. According to a preferred embodiment of the invention the cooling element is accessible from the interior of the vehicle. According to an embodiment of the invention, cooling element 18 constitutes an evaporating device and, when solenoid valve 11 is closed, the refrigerant fluid is passed through element 18 via an expansion valve 13.

Figure 2:
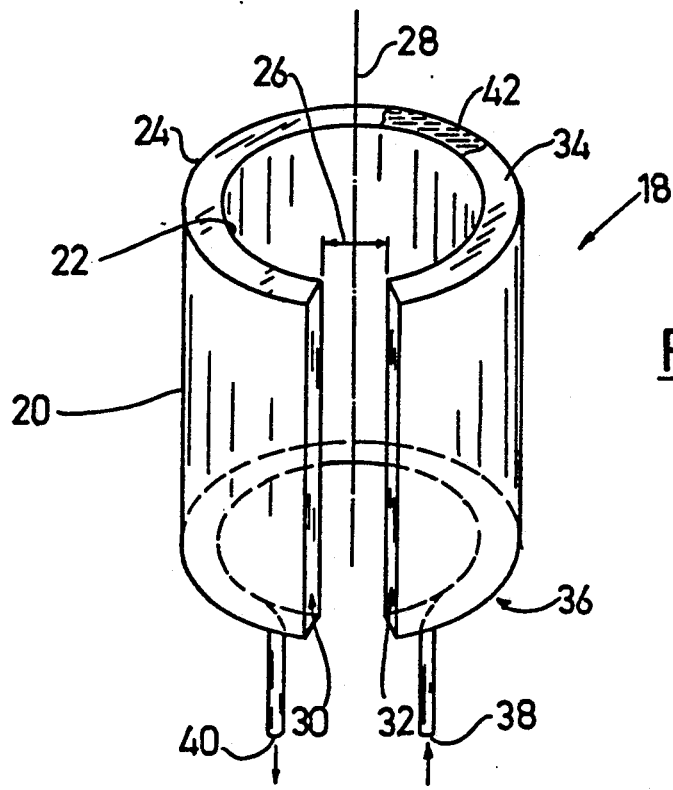
FIG. 2 is an illustration of a cooling element shown in FIG. 1, constructed and operative according to an embodiment of the present invention.
Figure 3A:
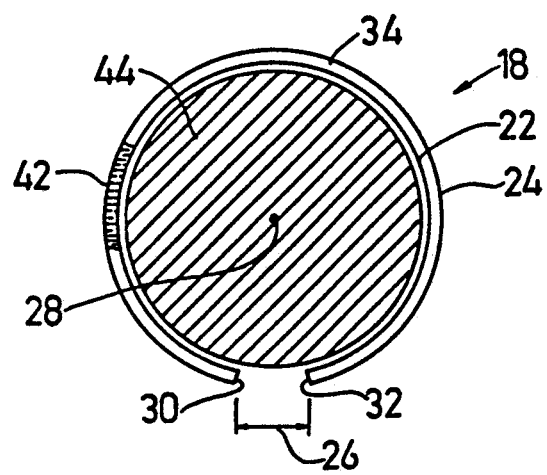
FIGS. 3A and 3B are partially cut-away plan view illustrations of the cooling element of FIG. 2 in nonoperative and operative modes respectively.
Figure 3B:
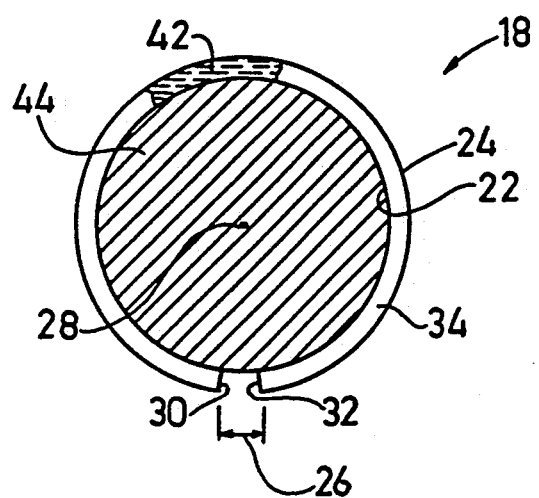

Referring now to FIGS. 2, 3A and 3B, there is shown a cooling element constructed and operative according to an embodiment of the present invention. In the shown embodiment element 18 comprises a mantle 20 which is constructed from two concentric, typically metal, partially open, inner and outer cylinders, referenced 22 and 24 respectively. A gap 26, typically parallel to a longitudinal axis 28 of mantle 20 is defined between open edges 30 and 32 thereof and permits expansion and contraction thereof according to different modes of operation.

Cylinders 22 and 24 are connected, for example, by welding, by top and bottom annular members, respectively referenced 34 and 36, so as to define a flow path for the refrigerant fluid, referenced 42, between the cylinders. There are also provided fluid entry and exit conduits, respectively referenced 38 and 40 (FIG. 2), through which the refrigerant fluid enters and exits mantle 20.

With particular reference to FIG. 3A, when in a non-cooled state, which corresponds to element 18 being in a non-operative mode, the saturated pressure of the refrigerant fluid, which typically is Freon 12, is about 6.8 atm gauge and mantle 20 is opened sufficiently so as to permit the insertion of a beverage can 44 thereinto.

Referring to FIG. 3B, refrigerant fluid is provided to mantle 20 at a temperature of approximately −18 degrees celsius and has a low pressure of about 0.5 atm gauge. According to the shown embodiment, mantle 20 serves as an evaporator and, due to the further drop in pressure experienced by the fluid as it enters the mantle, it contracts about axis 28 such that gap 26 becomes narrower. Inner cylinder 22 of mantle 20 thus tightens around and engages can 44. The relatively warm beverage contained in can 44 is quickly cooled by contact with the relatively cold surface of inner cylinder 22.

When the flow of refrigerant fluid through mantle 20 ceases, pressure therein rises again, so causing expansion of mantle 20 so as to permit release of the beverage can therefrom. In accordance with an alternative embodiment of the invention, mechanical apparatus (not shown) may be provided for aiding the opening and closing of mantle 20.

It will be appreciated by persons skilled in the art, that the temperature of −18 degrees celsius to which the refrigerant fluid is lowered is substantially lower than the temperature of typically +5 degrees celsius, to which the fluid is lowered in evaporator 16 of the vehicle air conditioning system. This substantially lower temperature is attained due to the internal construction of expansion valve 13 which provides a relatively large pressure drop and, therefore, a relatively large temperature drop.

It has been found in experiments using the above-described cooling element that it is possible to cool a standard-sized can containing about 330 ml of a beverage from 32 degrees celsius to about 10 degrees celsius in approximately three to four minutes.

Figure 4:
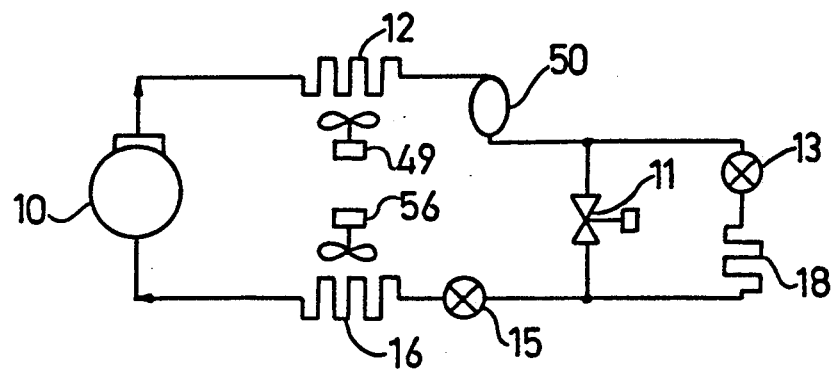
FIG. 4 is a block diagram illustration of a vehicle refrigeration and beverage cooling system of the present invention, operative in accordance with an embodiment of the present invention.

Referring to FIG. 4, there is shown a block diagram illustration of a vehicle refrigeration system with which is combined a beverage cooling system, constructed and operative in accordance with the present invention.

A compressor clutch 46 (FIG. 5) which activates compressor 10 is operated by a drive belt associated with the vehicle. A liquefiable gas, typically Freon 12, enters compressor 10 and the gas is compressed to a pressure of about 12.2 atm gauge at about 55 degrees celsius. The gas is passed to condenser 12 while ambient air is circulated thereover by a fan 49 and the gas is thus liquefied at a temperature of about 50 degrees celsius.

The liquefied gas thereafter flows to a liquid accumulator 50 and then passes to thermostatic expansion valve 15 whereat the pressure of the liquid is reduced to about 2.5 atm gauge and the temperature of the liquid is reduced to about 5 degrees celsius. The liquid is thereafter passed to evaporator coil 16. Air from the interior of the vehicle is circulated across evaporator 16 by a fan 56 and is passed back into the vehicle at a significantly reduced temperature. The gas is then passed from evaporator 16 back into compressor 10.

According to the shown embodiment of the invention, the beverage cooling system of the present invention is operable only when the air conditioning system of the vehicle is on.

In order to provide the refrigerant fluid to beverage cooling element 18 at a temperature significantly lower than the temperature at which the refrigerant fluid is provided to evaporator 16 of the air conditioning, expansion valve 13 provides a greater constriction to fluid flow than expansion valve 15 of the air conditioning. When solenoid valve 11 is open, the refrigerant fluid flows along the path having the least resistance and so substantially all of the refrigerant fluid flows via valve 11 bypassing the beverage cooling system.

When, however, solenoid valve 11 is closed, the refrigerant liquid flows through expansion valve 13 and cooling element 18. According to the shown embodiment, element 18 is constructed so as to provide further evaporation and cooling of the refrigerant fluid. According to an alternative embodiment, element 18 is operative to receive and permit passage of the fluid, without further cooling it.

Figure 5:
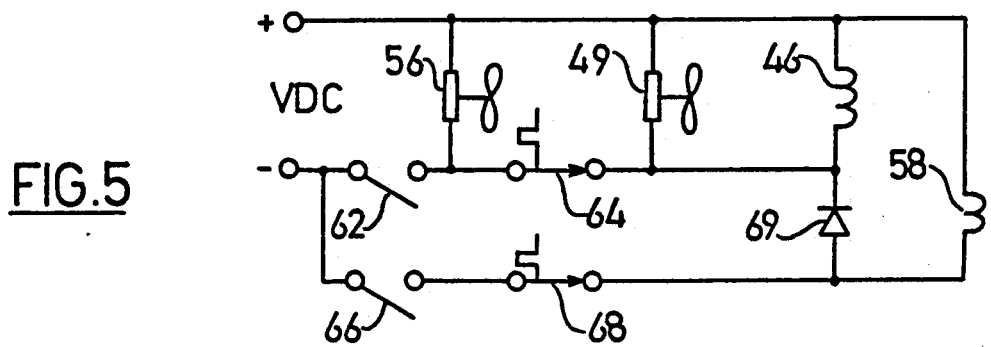
FIG. 5 is a schematic illustration of the electrical wiring system shown in FIG. 4.

With reference to FIG. 5, there is shown, in schematic fashion, an illustration of the electrical wiring system of the apparatus shown in FIG. 4. When a switch 62 is closed, evaporator fan 56 is operated. At a preselected minimum temperature a thermostat 64 is operative to set the air conditioning system in an ON mode, whereat condenser fan 49 is operated and compressor clutch 46 is activated.

In accordance with the shown embodiment, a switch 66 is provided to switch the beverage cooling system of the present invention into an ON mode. When this happens and beverage cooling system thermostat 68 is in a cooling mode, compressor clutch 46 is activated via a diode 69 and solenoid valve 11 is closed so as to permit operation of the beverage cooling system. When a required degree of cooling is reached, thermostat 68 switches the beverage cooling system into an OFF mode.

Figure 6:
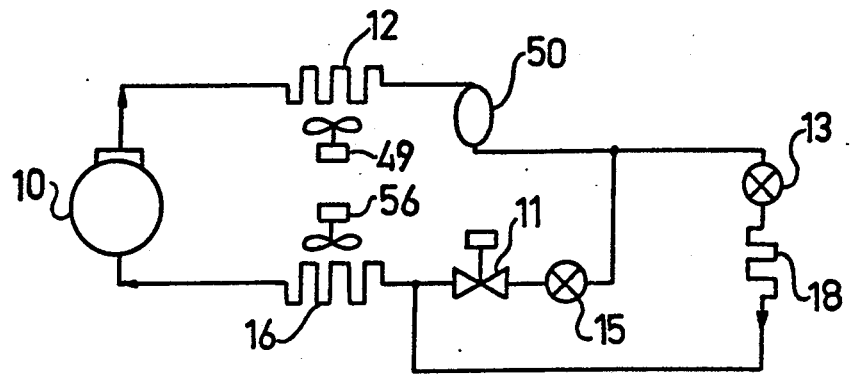
FIG. 6 is a block diagram illustration of a vehicle refrigeration and beverage cooling system of the present invention, operative in accordance with an alternative embodiment of the present invention.

Referring briefly to FIG. 6, there is shown a block diagram illustration of the vehicle refrigeration system and beverage cooling system of the present invention, operative in accordance with an alternative embodiment of the present invention.

According to the shown embodiment, expansion valve 15 and solenoid valve 11 of the air conditioning are connected in parallel with expansion valve 60 and cooling element 18 of the beverage cooling system. Accordingly, the cooling system is operable independently of the air conditioning or together therewith.

It will be appreciated by persons skilled in the art that according to the arrangement shown in FIG. 6, very rapid cooling of the beverage may be achieved when solenoid valve 11 is closed.

Figure 14:
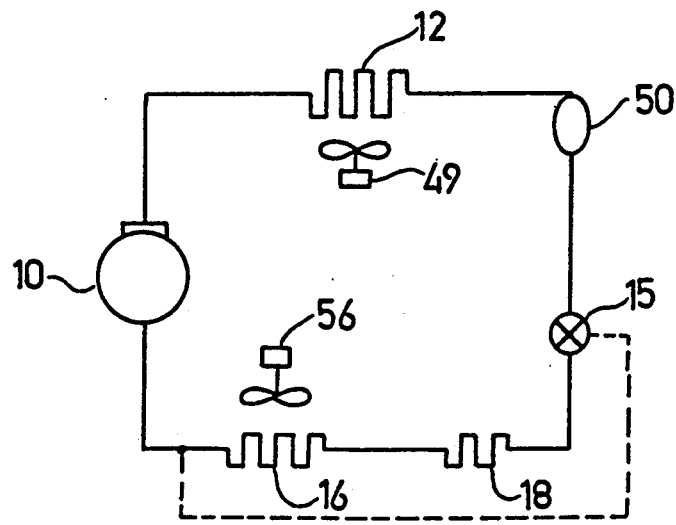
FIG. 14 is a block diagram illustration of a vehicle refrigeration and beverage cooling system of the present invention, operative in accordance with yet a further alternative embodiment of the present invention.

Referring now to FIG. 14, there is shown a block diagram illustration of a vehicle refrigeration system and the beverage cooling system of the present invention, operative in accordance with yet a further alternative embodiment of the present invention.

In the shown arrangement, expansion valve 15 is thermostatically controlled and device 18 and evaporator 16 are connected in series.

It has been found that rapid cooling of a beverage may be achieved by switching off fan 56. As less ambient air is circulated across evaporator 16, the temperature downstream thereof is lower than when fan 56 is in operation. Thermostatically controlled expansion valve 15 senses the lower temperature downstream of evaporator 16 and thus becomes more constricted. The increased constriction causes a greater temperature drop across valve 15 and the temperature of the fluid provided to device 18 drops accordingly to, for example, about −12 degrees celsius.

It will be appreciated that in the arrangement shown in FIG. 14, solenoid valve 11 and expansion valve 13 (both of FIG. 6) are not needed.

With further reference to FIG. 5 and in accordance with an alternative embodiment of the invention, an automatic release mechanism may be used in conjunction with thermostat 68 and according to yet a further embodiment of the invention, the thermostat may be replaced by a timer, or it may be used in conjunction therewith.

According to one embodiment of the invention, cooling element 18 is mantle 20, shown and described above in conjunction with FIGS. 2 to 3B.

Figure 7:
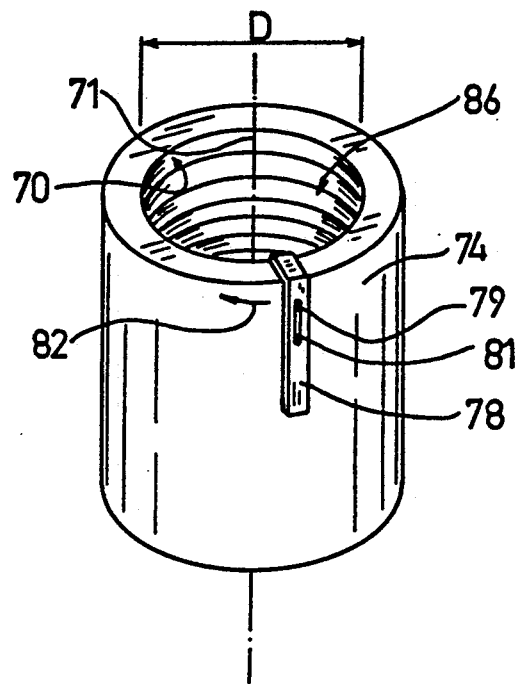
FIG. 7 is an illustration of a cooling element shown in FIG. 1, constructed and operative according to an alternative embodiment of the present invention.
Figure 8:
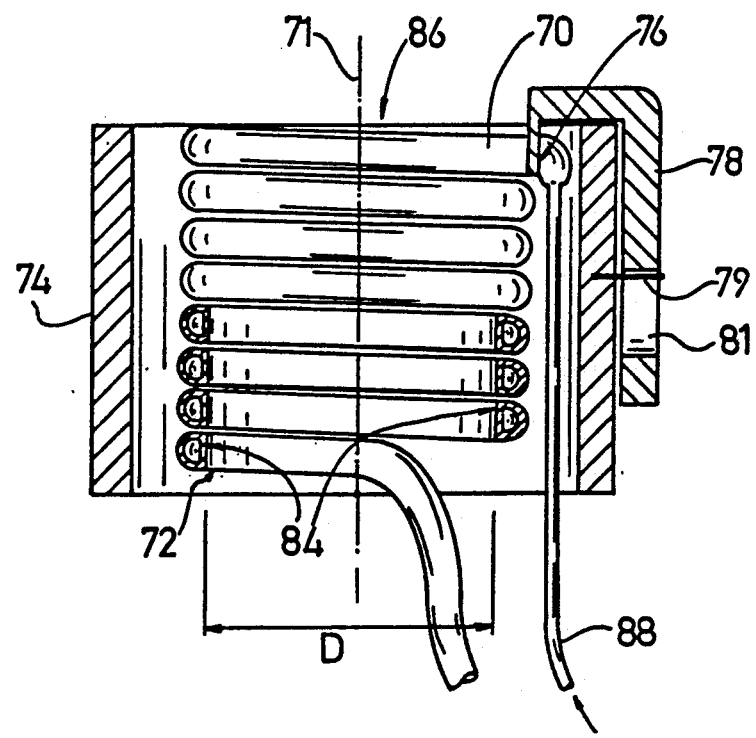
FIG. 8 is a partially cut-away view of the cooling element shown in FIG. 7.

According to an alternative embodiment of the invention and with reference to FIGS. 7 and 8, cooling element 18 is a coil 70 defining an axis of symmetry 71. Coil 70 defines an internal diameter of at least D, that is slightly smaller than the external diameter of a beverage container, such as a can, the contents of which it is intended to cool. One end 72 of coil 70 is fixed with respect to a housing 74, made typically of plastic, and the other end 76 of coil 70 is movable with respect to the housing.

A handle 78 is mounted onto a housing 74 typically by means of a pin 79 fixed thereto, the pin also passing through a groove 81 formed in handle 78. Handle 78 is attached to end 76 of coil 70 such that when handle 78 is rotated about pin 79 in a direction indicated by arrow 82, the internal diameter of the coil is increased. Once a container has been inserted into a volume 86 surrounded by the coil, handle 78 is released and, as diameter D in the absence of the container would be smaller than the diameter thereof, the container becomes tightly engaged by the coil.

According to the shown embodiment, coil 70 is hollow and defines a passageway, one end of which, referenced 77, is connected to and communicates with a flexible capillary tube 88. With particular reference to FIG. 8, it will be appreciated that coil 70 defines a generally planar engagement surface 84 with a container placed therein. This ensures a high degree of contact between coil 70 and the container and ensures rapid cooling of the beverage contained therein.

Figure 9:
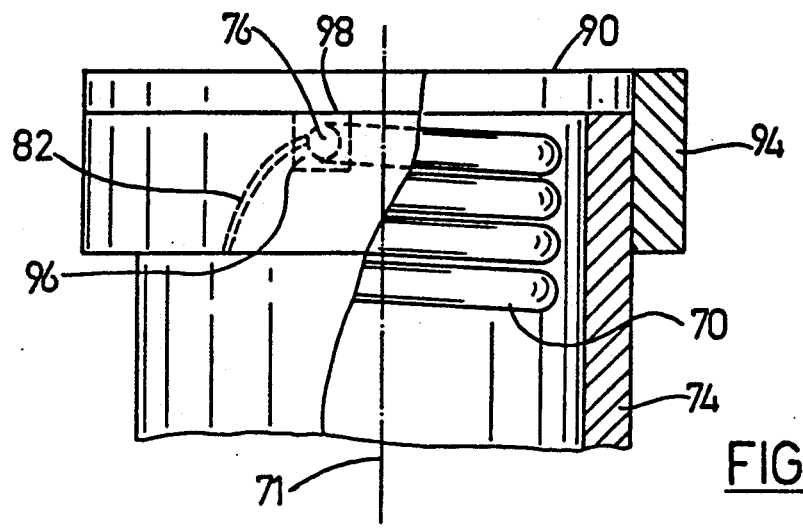
FIG. 9 is a partially cut-away view of a portion of the cooling element shown in FIG. 7, constructed and operative in accordance with an alternative embodiment of the invention.
Figure 10:
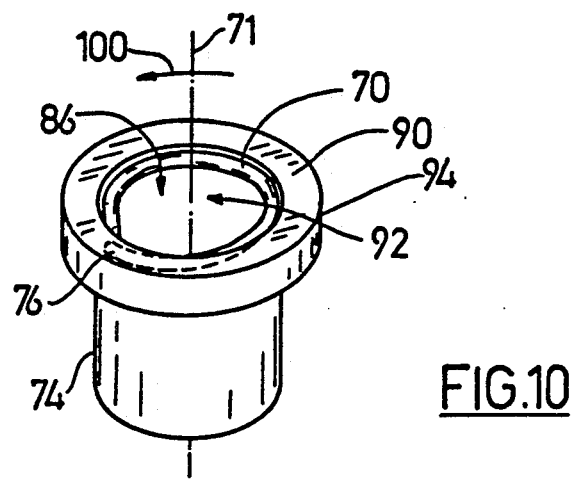
FIG. 10 is a perspective illustration of the apparatus shown in FIG. 7.

Reference is now made to FIGS. 9 and 10, which show apparatus for opening and closing coil 70, constructed and operative in accordance with an alternative embodiment of the invention. The apparatus comprises an annular element 90 which defines a gap 92 through which a suitably sized beverage container may be inserted. Element 90 further defines a side wall 94 which extends over and engages an upper portion of housing 74.

End 76 of coil 70 is engaged and retained by a protrusion 96 formed on a surface 98 of element 90 such that when it is rotated about axis 71 in a direction shown by arrow 100 (FIG. 10), coil 70 is opened sufficiently to permit insertion of a beverage container into volume 86 defined by coil 70. When element 90 is released, spring 70 returns to a more closed position.

Figure 12:
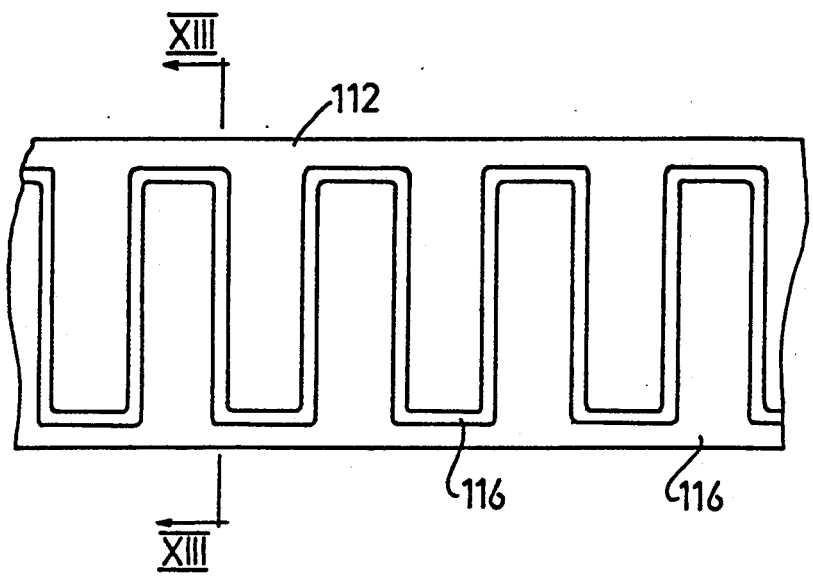
FIG. 12 is an illustration of a portion of roll bond plate, useful in the cooling element of FIG. 11.
Figure 13:
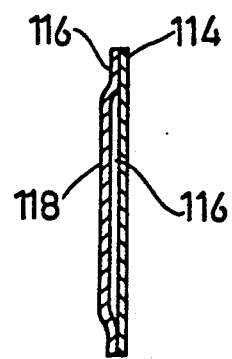
FIG. 13 is a cross-section of the apparatus shown in FIG. 12, taken along line XIII—XIII therein.
Figure 11:
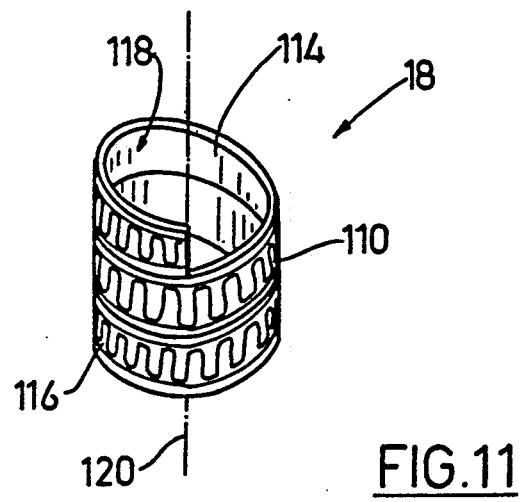
FIG. 11 is an illustration of a cooling element shown in FIG. 1, constructed and operative according to a further alternative embodiment of the present invention.

According to yet a further embodiment of the invention and with reference to FIGS. 11, 12 and 13, cooling element 18 comprises a sleeve 110 which, although having a structure different therefrom, is similar in operation to coil 70 (FIGS. 7 and 8). For purposes of clarity and conciseness, no mechanism for opening and closing sleeve 110 is shown, it being similar to either of the mechanisms used for opening and closing coil 70, as shown and described in conjunction with FIGS. 7 and 8 and FIGS. 9 and 10.

Sleeve 110 is formed from a one side roll bond plate 112, shown is sheet configuration in FIG. 12. Plate 112 comprises a first, smooth plate 114 which is joined to a second plate 116. In an inward-facing surface of plate 116 there is defined an elongate depression 118 which together with plate 114 defines a conduit 116.

Sleeve 110 comprises a length of plate 112 wound in helical fashion about an axis 120. As will be appreciated by persons skilled in the art, when refrigerant fluid is passed through conduit 116 after having passed through expansion valve 15, FIGS. 4 and 6), the drop in temperature of the fluid is effective to cool the contents of a beverage can (not shown) that is supported by sleeve 110 and which is engaged by an inward-facing surface 118 thereof.

It will be appreciated by persons skilled in the art, that the present invention is not limited by what has been particularly shown and described above. The scope of the invention is limited, rather, solely by the claims which follow.

We claim:

1. A vehicle having an integrated air conditioning system and beverage cooling system comprising:
   means for compressing a refrigerant fluid,
   first means for receiving and evaporating the compressed refrigerant fluid,
   means associated with said air conditioning system for circulating air across said first means for receiving and evaporating.
   second means in heat conductive engagement with a beverage container for receiving and evaporating the compressed refrigerant fluid comprising a coil arranged about a beverage container support volume; and
   means for causing expansion and contraction of said coil;
   wherein said coil comprises a fluid conduit having first and second ends and defines an inward-facing container engagement surface; and
   wherein said coil comprises a fluid conduit having first and second ends and defines an inward-facing container engagement surface; and
   wherein said coil comprises a wound length of heat conductive material that has a thickness of a first magnitude and a width of a second magnitude substantially greater than said first magnitude, said heat-conductive conductive material defining a substantially planar surface when in an unwound position and said planar surface constituting a beverage container engagement surface when said heat-conductive material is in a wound position.

2. A vehicle having an integrated air conditioning system and beverage cooling system comprising:
   means for compressing a refrigerant fluid,
   first means for receiving and evaporating the compressed refrigerant fluid,
   means associated with said air conditioning system for circulating air across said first means for receiving and evaporating.
   second means in heat conductive engagement with a beverage container for receiving and evaporating the compressed refrigerant fluid comprising a coil arranged about a beverage container support volume; and
   means for causing expansion and contraction of said coil;
   wherein said coil comprises a fluid conduit having first and second ends and defines an inward-facing container engagement surface which describes a cylindrical volume; and
   wherein said coil comprises a wound length of heat-conductive material that has a thickness of a first magnitude and a width of a second magnitude substantially greater than said first magnitude, said heat-conductive material defining a substantially planar surface when in an unwound position and said planar surface constituting a beverage container engagement surface when said heat-conductive material is in a wound position.

3. A vehicle according to claim 1, and wherein said heat--conductive material is roll-bond plate.

4. A vehicle having an integrated air conditioning system and beverage cooling system comprising:
   means for compressing a refrigerant fluid,
   first means for receiving and evaporating the compressed refrigerant fluid,
   means associated with said air conditioning system for circulating air across said first means for receiving and evaporating,
   second means in heat conductive engagement with a beverage container for receiving and evaporating the compressed refrigerant fluid; and
   first and second means located downstream of said means for compressing and upstream of respective said first and said second means for receiving and evaporating for receiving and causing expansion of the refrigerant fluid;
   wherein said first means for receiving and evaporating receives the refrigerant fluid in liquid form at a first pressure and at a first temperature and is operative to reduce the pressure of the liquid too a second pressure and the temperature of the liquid to a second temperature, the second pressure and the second temperature being respectively substantially lower than the first pressure and the first temperature; said second means for receiving and evaporating receiving the refrigerant fluid in liquid form at a third pressure and at a third temperature and being operative to reduce the pressure of the liquid to a fourth pressure and the temperature of the liquid to a fourth temperature, the fourth pressure and the fourth temperature being respectively substantially lower than the third pressure and the third temperature;
   wherein said first means for receiving and causing expansion comprises means for providing a first constriction to the fluid flow and aid second means for receiving and causing expansion comprises means for providing a second constriction to the fluid flow greater than said first constriction;
   and wherein said first means for receiving and causing expansion and said first means for receiving and evaporating are arranged in series with and downstream of said second means for receiving and causing expansion and said second means for receiving and evaporating, there also being provided a valve associated with a fluid flow path extending between an inlet located upstream of said second means for receiving and causing expansion and an outlet located between said second means for receiving and evaporating and said first means for receiving and causing expansion, the fluid being permitted to flow through said valve when aid valve is open, substantially to the exclusion of fluid flow through said second means for receiving and causing expansion and said second means for receiving and evaporating, fluid flow being diverted through said second means for receiving and causing expansion and said second means for receiving and evaporating when said valve is closed.

* * * * *